United States Patent [19]

Thir

[11] 4,138,094
[45] Feb. 6, 1979

[54] ADJUSTABLE RAILING ASSEMBLY

[76] Inventor: Peter Thir, P.O. Box 1036, La Plata, Md. 20646

[21] Appl. No.: 783,317

[22] Filed: Mar. 31, 1977

[51] Int. Cl.² .......................................... E04H 17/00
[52] U.S. Cl. ..................................... 256/67; 403/381; 52/298; 182/159
[58] Field of Search .................. 256/67, 59, 60, 65, 256/21, 22; 182/159, 160; 52;296;298/; 33/108, 115, 116, 117; 248/300; 403/163, 117, 113, 381, 331, 263, 230, 232.1, 237, 234, 235, 187, 233, 231

[56] References Cited

U.S. PATENT DOCUMENTS

| 210,526 | 12/1878 | Hanson | 256/67 |
| 258,186 | 5/1882 | Winters | 182/159 X |
| 3,004,751 | 10/1961 | Woodward | 256/67 |
| 3,306,586 | 2/1967 | Green | 256/67 X |

FOREIGN PATENT DOCUMENTS

| 77818 | 7/1954 | Denmark | 403/263 |
| 2350938 | 4/1974 | Fed. Rep. of Germany | 403/381 |
| 515347 | 11/1920 | France | 182/160 |
| 627215 | 5/1927 | France | 182/160 |

Primary Examiner—Andrew V. Kundrat
Attorney, Agent, or Firm—Francis B. Francois

[57] ABSTRACT

An adjustable railing section including upper and lower rails connected by spaced vertical members is mountable between a pair of vertical posts, the posts being secured in vertical positions on a surface by use of U-shaped brackets and individually inserted fasteners that provide for vertical orientation of the posts in two planes perpendicular to each other. The undersurface of the upper rail and the upper surface of the lower rail of each section have spaced, transversely extending, confronting cylindrical sockets formed therein, and the opposite ends of the vertical members carry cylindrical formations that are receivable in said upper and lower cylindrical sockets. The socket openings and the cylindrical formations are configured to permit pivotal movement of the vertical members relative to the upper and lower rails, whereby the angles between said rails and the vertical members can be adjusted universally over a preselected range.

11 Claims, 10 Drawing Figures

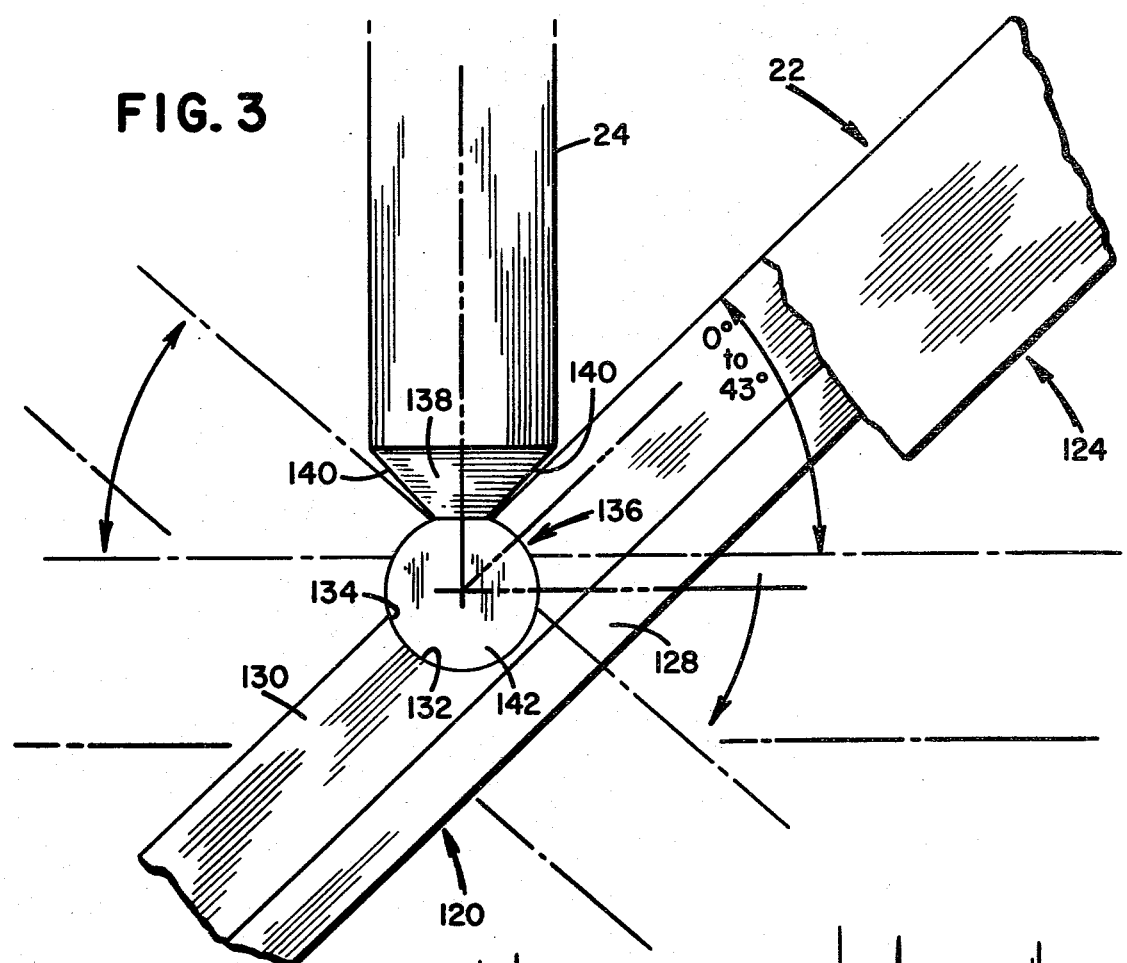
FIG. 3
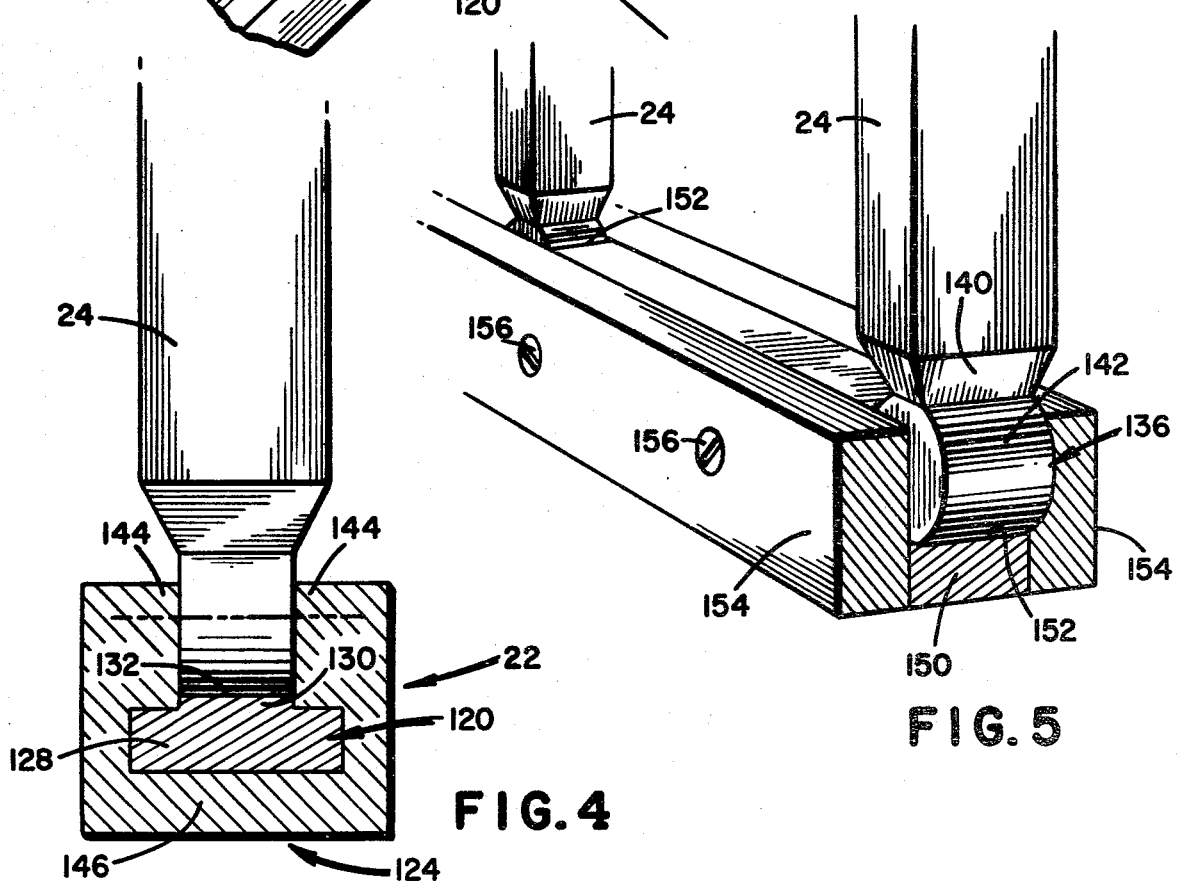
FIG. 4
FIG. 5

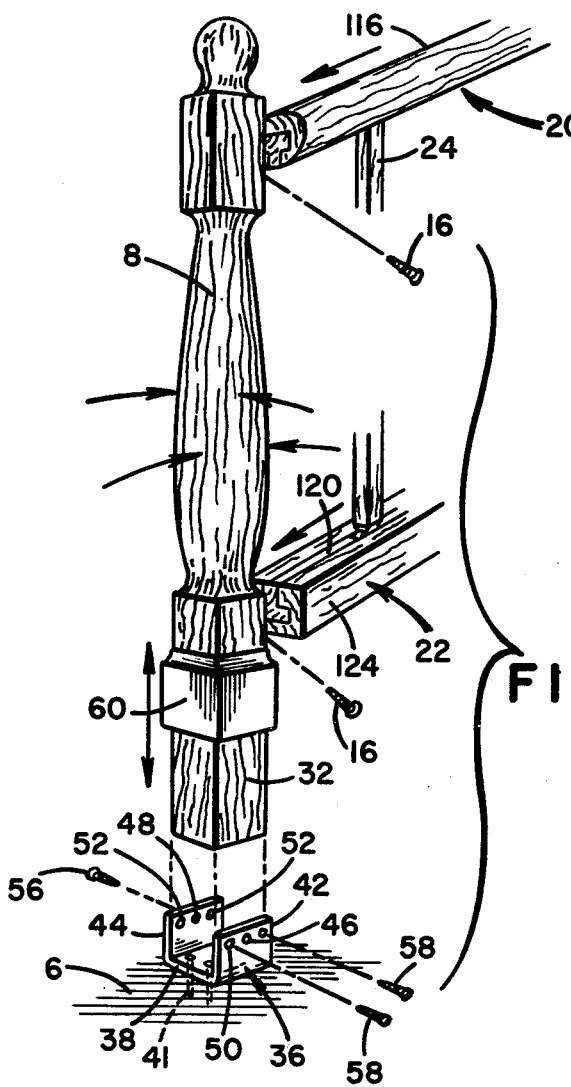
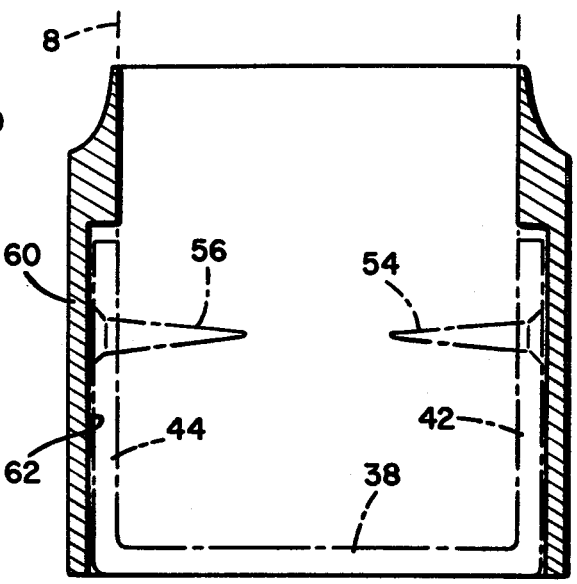
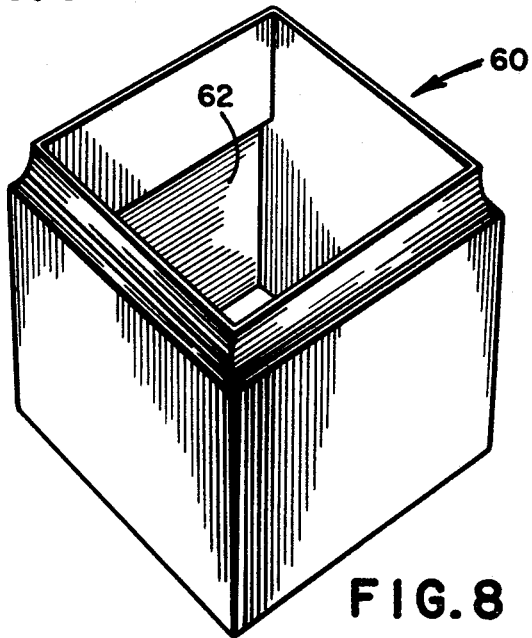
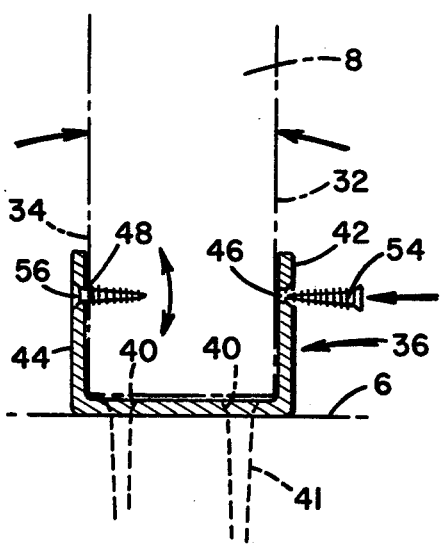
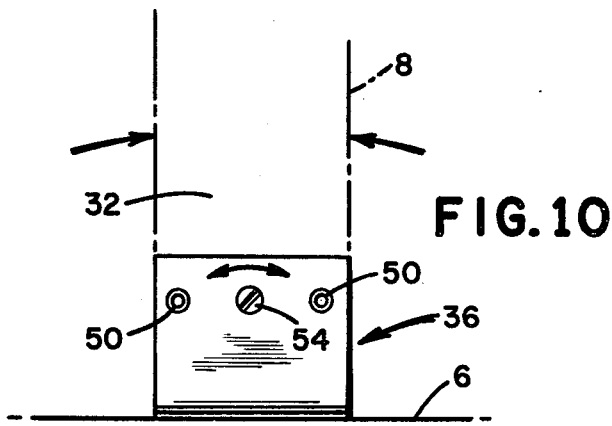

ADJUSTABLE RAILING ASSEMBLY

BACKGROUND OF THE INVENTION

1. Field of the Invention

The present invention relates generally to railings mountable on stairs, balconies and elsewhere, to provide a barrier. More particularly, it relates to an improved adjustable railing assembly that can be easily mass-produced, and which is universally adjustable over a predetermined range for mounting on different stairs and other inclines.

2. Description of the Prior Art

It is common practice to provide railings on the exposed sides of stairs, along balconies, and the like, to act as a barrier for preventing a person from accidently falling off. In modern building codes such railings are called for in many locations, and there is need for a railing arrangement that can be easily manufactured and installed.

A problem in providing a railing assembly is that the conditions of installation will vary from one location to another, particularly when the railing is to be installed on a stairs, or an inclined surface. Typically, a railing section will include upper and lower rails, and spaced vertical members extending therebetween. It is normally desired to have the vertical members arranged in a true vertical position after the railing section has been installed. Thus, on an inclined surface the railing section must be specially constructed to allow the angles between the vertical members and the upper and lower rails to be adjusted, so that such a vertical orientation can occur.

If all stairs had the same incline, it would be an easy matter to manufacture a uniform railing for all stairs. But in actual practice the angles of inclination will vary from job to job, and thus the use of a universal railing assembly is not practical. Rather, what is required is a railing assembly that can be adjusted at the time of installation to suit the particular angle of inclination involved, so that the vertical members of each rail section will be truly vertical when installation is complete.

Over the years, there have been numerous proposals for providing a railing assembly which can be adjusted prior to, or during, installation. It is a common practice with ornamental iron fences to provide castings on the vertical members which have notches or grooves therein to receive the upper and lower members, the castings providing for tilting of the upper and lower railings to different angles. Typical of such arrangements are those shown in U.S. Pat. Nos. 271,196, 263,324 and 211,933. The castings in such fences are difficult to manufacture, the fence is mechanically involved to assemble, and the resultant arrangement presents a rather cluttered appearance that is unacceptable for modern tastes. Moreover, such systems are not adaptable for easy use with wood, and the costs of manufacture are high.

A less complicated approach has been to simply connect the opposite ends of the vertical members to the upper and lower rails by pivot fasteners, railings of this type being illustrated by U.S. Pat. Nos. 2,346,111 and 3,306,586. This concept has a disadvantage in that the railing parts must usually be assembled in a factory or the like, making transport to the site difficult. Further, the pivot joint has little asthetic appeal, and is not too strong mechanically.

Another arrangement is shown in U.S. Pat. No. 2,823,014 wherein the opposite ends of the vertical members have circular bands welded thereto, which are then connected to the upper and lower railings, and to each other, by rivets. The railing is somewhat difficult to assemble, and again is not adaptable to be universally pleasing in appearance.

Perhaps the most common adjustable railing arrangement in use today is one wherein the upper and lower ends of the vertical members are simply welded to the upper and lower rails, either directly or through a hinge piece, the whole assembly being made of metal. The assembly is manufactured in the factory, and thereafter it is simply bent into the desired configuration. Typical arrangements of this type are shown in U.S. Pat. Nos. 2,715,513, 3,202,401 and 2,909,361. While such railings have found acceptance, it is necessary to transport the assembled units to the place of installation, and the resultant arrangement may again lack asthetic appeal for some users. Further, the material employed is limited to a metal like steel, which can be bent and still retain its strength, so that wood cannot be utilized where the asthetic characteristics thereof might be wanted.

There is need for an adjustable railing assembly that can be made of wood, metal, plastic or like materials with equal ease, which is strong when assembled and presents a pleasing appearance, and which can be sold and transported in separate pieces that can be easily assembled and used on location, even by a person with only limited skills. The present invention is intended to satisfy that need.

SUMMARY OF THE INVENTION

The adjustable railing section of the invention is designed for installation between a pair of upright posts, or other fixed vertical members, and includes upper and lower rails, and a plurality of vertical members adapted to extend between the rails. The undersurface of the upper rail has spaced, downwardly opening, transversely extending cylindrical sockets formed therein, which extend to at least one side wall of the upper rail. Similar cylindrical sockets are formed on the upper surface of the lower rail, and have openings that face upwardly toward the downwardly facing openings of the upper cylindrical sockets.

The vertical members have cylindrical formations on the opposite ends thereof, comprising a neck portion on which a cylinder is supported, the neck portions where they join the cylinders being substantially thinner than the width of the upper and lower cylindrical socket openings. To assemble the railing section, the cylinders on the opposite ends of the vertical members are simply fitted telescopically into the upper and lower cylindrical sockets from the open ends thereof, whereby the rails and the vertical members are connected for pivotal movements relative to each other.

Thereafter, the railing section is simply adjusted to accomodate the desired angle of inclination, and so that the vertical members are truly vertical. The opposite ends of the upper and lower rails are then secured in place, and installation is complete.

The railing of the invention has several advantages over those arrangements previously proposed. First of all, it can be made of wood, metal, plastic, and any similar materials, with equal ease. Thus, the user has a wider choice of materials than with present railing arrangements, which are nearly universally made from steel. A second advantage of the invention is that it can be sold in a disassembled state for easy transport, yet be easily assembled on the job without the need for tools. The railing of the invention also presents a most pleasing appearance, and is strong when erected.

In order to secure the cylindrical formations within their upper and lower cylindrical sockets, a retainer strip is mounted on the side wall of the rails on which the cylindrical sockets open. In one embodiment of the invention the retainer strip is simply secured in position by nails or other suitable fastener. In the preferred embodiment, however, the upper and lower rails have a T-shaped cross section, and the retainer strips are joined by a bridging member to form a retainer member that is telescopically receivable on the rails. With this arrangement, no tools are again required for assembly of the railing section.

In order to mount the railing section where nearby supporting walls are not available, vertical posts are first installed on the mounting surfaces of the balcony or stairs. Since such posts must support the railings when in use, it is necessary that they be installed firmly in place. Further, to ensure proper and an esthetically pleasing installation, the posts should be in a truly vertical position. The adjustable railing assembly of the invention includes apparatus for mounting posts, to meet these goals.

According to the invention, a U-shaped bracket is employed, the base wall of which is secured to the mounting surface in the usual manner. The two vertical walls of the bracket are spaced apart a distance slightly greater than a pair of parallel, opposed walls on the bottom portion of the post to be mounted, and have a first pair of aligned bores therein, and at least one second bore spaced from the first bores.

Once the bracket has been secured to the mounting surface, the lower end of the post is placed therein, and a first fastener is inserted through one of the first, aligned bores, and is driven into the post. The post is then adjusted until it is vertical in a plane that includes the two first, aligned bores, after which a fastener is installed in the other of the first bores. The post is thereby pivotally mounted for movement in a plane at right angles to the first plane, but is firmly secured to extend vertically in the first plane.

Thereafter, a fastener is inserted through the second bore, after the post has been aligned vertically in the second plane. The post is then secured in position, and the railing section can be attached thereto.

In order to provide a more pleasing appearance, the invention also includes a collar that is slidably receivable over the lower ends of the vertical posts, and over their associated U-shaped mounting brackets.

It is the principal object of the present invention to provide an adjustable railing assembly that can be made from a variety of different materials, which can be manufactured and sold disassembled, and which can later be assembled with ease by even a person of limited skill.

Another object is to provide an arrangement for easily and quickly mounting a vertical post in a truly vertical position, ready to accept a railing section.

A further object of the invention is to provide an adjustable railing section that is universally adjustable over a predetermined range for mounting on different inclined surfaces, and which will be asthetically pleasing in appearance.

Other objects and many of the attendant advantages of the invention will become readily apparent from the following Description of the Preferred Embodiments, when taken in conjunction with the accompanying drawings.

BRIEF DESCRIPTION OF THE DRAWINGS

FIG. 3 is an enlarged, diagrammatic view showing the relationship between one of the cylindrical formations and the bottom rail of FIG. 1, illustrating the relationship of the thickness of the neck supporting the cylinder to the opening in the cylindrical socket;

FIG. 4 is an enlarged, fragmentary vertical cross sectional view taken through the lower rail of FIG. 1, showing the T-shape thereof, and the manner in which the retainer member functions to confine the lower end of the vertical member;

FIG. 5 is a perspective view showing another embodiment of the invention, wherein separate retainer strips are secured to the opposite side walls of the rail;

FIG. 6 is an enlarged, exploded perspective view of the lowermost supporting post of FIG. 1, showing the mounting bracket, the collar, and the fasteners used to mount the post;

FIG. 7 is a vertical sectional view taken through the collar of FIG. 6, and showing how the interior thereof is configured to accomodate the U-shaped mounting bracket;

FIG. 8 is a top, perspective view of the mounting collar of FIGS. 6 and 7;

FIG. 9 is a diagrammatic view showing how the U-shaped mounting bracket and the first, aligned bores are utilized to secure the vertical post so that it is truly vertical in a first plane that includes the aligned bores; and FIG. 10 is a diagrammatic view showing how the installation of the vertical post of FIG. 6 is completed, by inserting the second fasteners into the second openings in the U-shaped mounting bracket.

DESCRIPTION OF THE PREFERRED EMBODIMENTS

Figure 1:
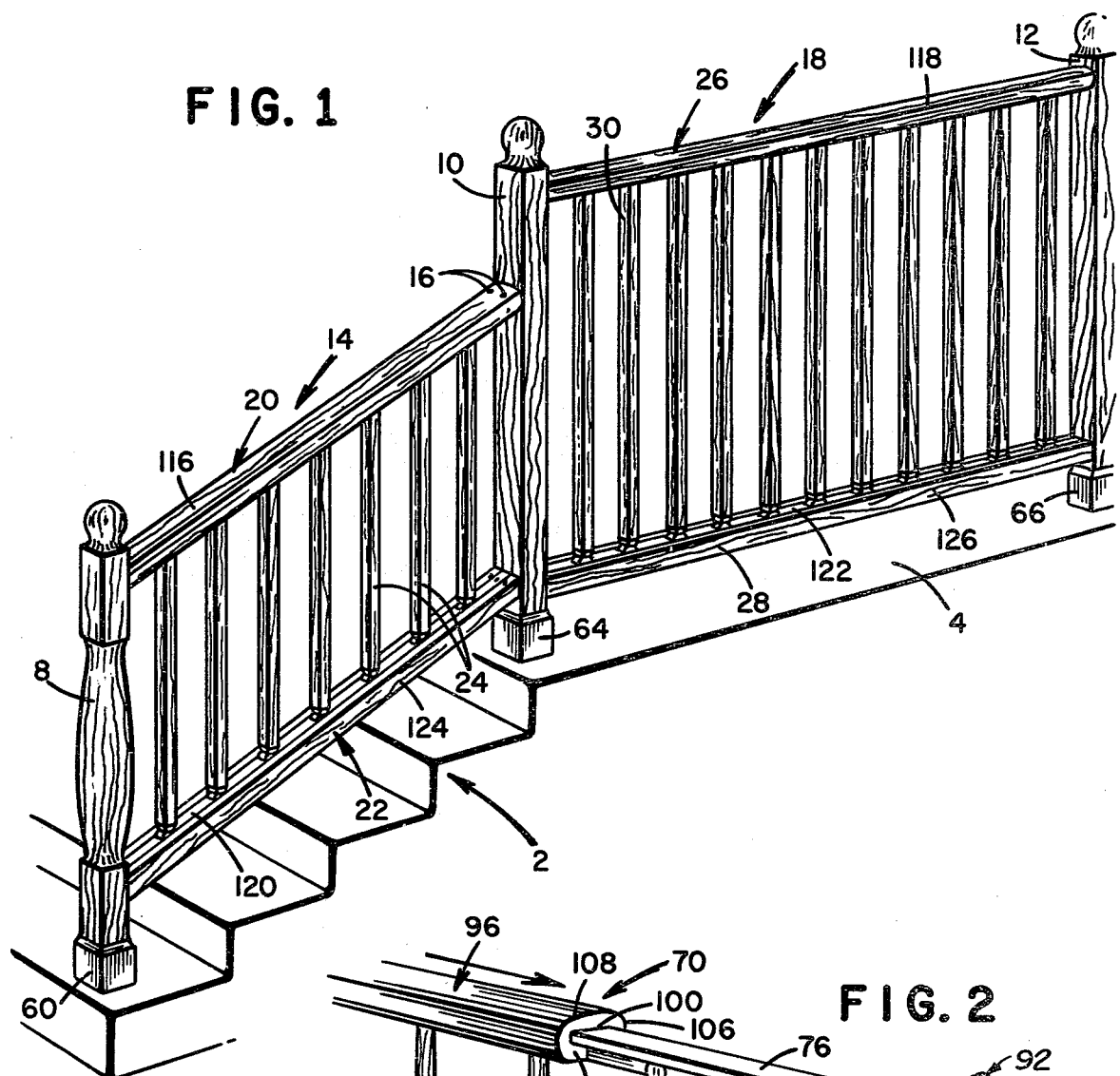
FIG. 1 is a perspective view showing a stair and landing with the supporting posts and two sections of railing constructed according to the preferred embodiment of the invention installed thereon, and illustrates the pleasing appearance provided by the invention.

Referring now to FIG. 1, a stairs is indicated generally at 2 and a landing at 4, the bottom step 6 of the stairs 2 having a vertical post 8 mounted thereon, and the landing 4 having spaced vertical posts 10 and 12 secured thereto. A first railing section 14 is secured by screws 16 to extend between the posts 8 and 10, and a similarly constructed, but taller, railing section 18 is similarly mounted to extend between the posts 10 and 12.

The first railing section 14 includes an upper rail assembly 20 and a lower rail assembly 22, connected by a plurality of vertical members 24. Similarly, the second railing section 18 includes upper and lower rail assemblies 26 and 28, and vertical members 30. One feature of the invention is that the vertical members 24 are all interchangeable, and that if desired they can be interchanged during assembly for the vertical member 30, although such would of course change the heights of the railing sections.

The posts 8, 10 and 12 of FIG. 1 serve to support the railing sections 14 and 18, and thus they must be firmly mounted in position on their respective surfaces to furnish the necessary structural characteristics. Moreover, the posts should be mounted to extend truly vertical, both to facilitate mounting of the railing sections, and for asthetic reasons. The adjustable railing assembly of the invention includes means for easily and quickly mounting the posts, such being illustrated in detail in FIGS. 6 through 10.

Referring to FIGS. 6 through 10, the post 8 includes a pair of opposed, parallel surfaces 32 and 34 on the lower end thereof, the lower post end having a rectangular configuration of uniform dimensions for a substantial distance from its bottom. A U-shaped mounting bracket 36 is provided for securing the post 8 to the surface 6, and includes a base wall 38 having openings 40 therein for receiving fasteners 41 utilized to secure the bracket 36 to its supporting surface. A pair of vertical side walls 42 and 44 extend upwardly from the base wall 38 in parallel relationship, and as shown in FIG. 9, such are spaced apart a distance slightly greater than the distance between the parallel surfaces 32 and 34 on the lower end of the post 8.

The bracket side walls 42 and 44 have central, aligned first bores 46 and 48 respectively, therein. Disposed in spaced relationship from the bores 46 and 48 in the side walls 42 and 44 are second bores 50 and 52, respectively. First fasteners 54 and 56 are associated with the first, aligned bores 46 and 48, while second fasteners 58 are associated with the second bores 50 and 52, respectively.

The post 8 is mounted in the following manner. First, the U-shaped bracket 36 is secured to the step 6, by the fasteners 41 which pass through the openings 40 in the base wall 38. Then the lower end of the post 8 is inserted between the bracket side walls 42 and 44, with the post surfaces 32 and 34 facing the side walls. One of the first fasteners 54 or 56 is then installed. As shown in FIG. 9, the fastener 56 is installed first, and it serves to pivotally mount the post 8 for back-and-forth movement in the plane of the first, aligned bores 46 and 48, as indicated by the arrows in FIG. 9. The post 8 is then aligned to be truly vertical in this plane, after which the fastener 54 is installed.

Moving to FIG. 10, the post 8 is now pivotally mounted for back-and-forth movement in a second plane, disposed at right angles to the first plane containing the first, aligned bores 46 and 48. The post 8 is placed in a true vertical position, and then one of the fasteners 58 is installed. Thereafter, the balance of the fasteners 58 are installed, to firmly secure the post.

The bracket 36 provides a means to quickly, and firmly, mount the post 8. In order to improve the appearance of the installation, a rectangular collar 60 is telescopically received on the lower end of the post 8, such having hollowed-out interior wall portions 62 to receive the U-shaped bracket 36. In the alternative, of course, the lower end of the post 8 could be recessed to accomodate the side walls 42 and 44 of the bracket 36, in which instance the hollowed-out portions 62 would not be necessary. The collar 60 is slid into position after the post 8 has been secured to the U-shaped bracket 36, and provides a trim appearance to the assembly.

The posts 10 and 12 are installed in the same manner as the post 8, and have collars 64 and 66 thereon, respectively. In the drawing the posts 8, 10 and 12 are all made from wood, but it is to be understood that other materials can be equally employed. The advantage of wood is that it is pleasing in appearance, and can be easily worked into different configurations, as shown by the differences in appearance between the post 8 and the posts 10 and 12. Further, wood will take ordinary screw fasteners, making installation quite easy. In the case of a metal post, holes will first need to be drilled to accomodate the fasteners, and indeed even in the instance of wood posts the use of starting bores can ease installation.

Figure 2:
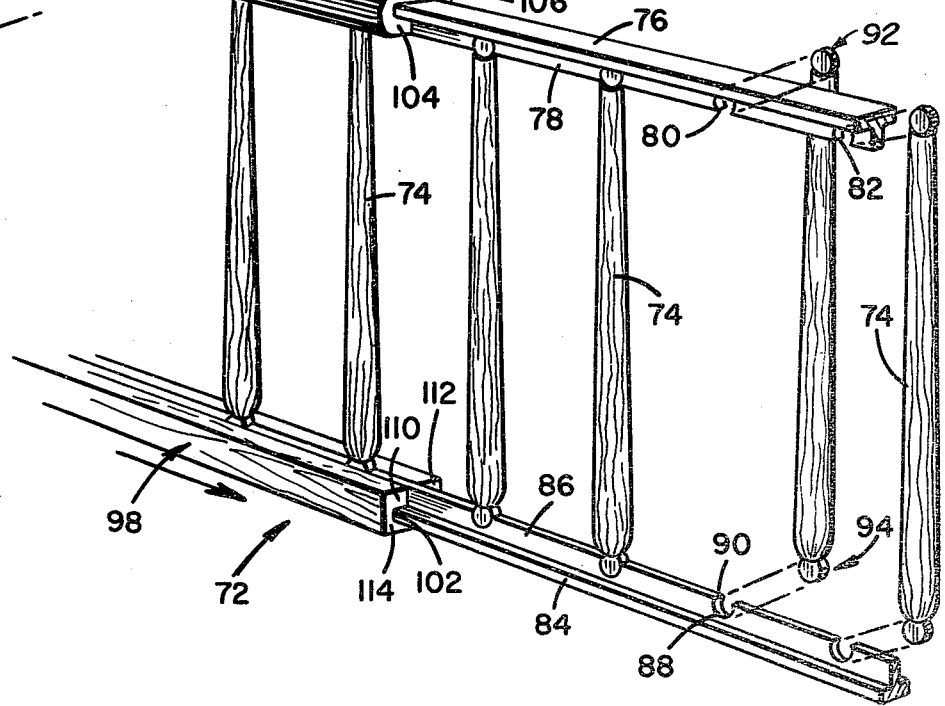
FIG. 2 is an exploded perspective view of a section of railing made according to the invention, showing the preferred embodiment of the invention wherein the upper and lower rails are T-shaped, and slidably receive retainer members thereon.

Turning now to FIGS. 1, 2, 3 and 4, the manner in which the rail sections 14 and 18 of the invention are constructed will be explained. FIG. 2 illustrates the principle of the adjustable railing of the preferred embodiment, and includes an upper rail assembly 70 corresponding to the upper rail assemblies 20 and 26, and a lower rail assembly 72 corresponding to the lower rail assembly 22 and 28, the two being connected by vertical members corresponding to the vertical members 24 and 30.

In FIG. 2 the upper rail assembly 70 includes a T-shaped upper rail 76, the center leg 78 of which has a plurality of transversely extending, cylindrical sockets 80 therein having downwardly-facing openings 82, the sockets 80 opening on both side walls of the center leg 78. Similarly, the lower rail assembly 72 includes an inverted, T-shaped lower rail 84, the center leg 86 of which has spaced cylindrical sockets 88 therein having upwardly-facing openings 90. The upper and lower cylindrical sockets 80 and 88 are arranged to confront each other, and normally will be spaced apart equal distances.

The opposite ends of the vertical members 74 have upper and lower cylindrical formations 92 and 94 thereon, which are slidably receivable in the upper and lower cylindrical sockets 80 and 88, respectively, as shown in FIG. 2. It will be understood that when the vertical members 74 are so installed, they can be pivoted relative to the upper and lower rails 76 and 84, over a pre-selected range of angles determined by the width of the slot openings 82 and 90, and the thickness of the base portions of the cylindrical formations 92 and 94. The rail section of FIG. 2 is universally adjustable over the preselected range, and moves in the manner of a parallelogram.

While the vertical members 74 are easily installed merely by inserting the cylindrical formations 92 and 94 into the open ends of the upper and lower sockets 80 and 88, such cylindrical formations must be retained in their sockets for the section to remain assembled. In order to provide for this in FIG. 2, upper and lower retainer members 96 and 98 are provided, which respectively have T-shaped interior cavities 100 and 102 adapted to slidingly receive the T-shaped upper and lower rails 76 and 84. Thus, the upper retainer member 96 includes a pair of retainer strip portions 104 and 106 that cover the open ends of the cylindrical sockets 80 to secure the cylindrical formations 92, and which are mounted on a bridging member 108. Similarly, the lower retainer member 98 includes retainer strip portions 110 and 112, mounted on a bridging member 114, the strip portions 110 and 112 and the member 114 defining a T-shaped cavity for slidably receiving the lower rail 84.

Referring again to FIG. 1, the upper rail assemblies 20 and 26 are identical in construction to the upper rail assembly 70 of FIG. 2, and respectively include retainer members 116 and 118 identical to the retainer member 96. Similarly, the lower rail assemblies 22 and 28 are identical in construction to the lower rail assembly 72 of FIG. 2, and respectively include T-shaped lower rails 120 and 122 identical to the lower rail 84, and lower retainer members 124 and 126, identical to the lower retainer member 98. The vertical members 24 and 30 of FIG. 1 correspond to the vertical members 74 of FIG. 2, as has been noted, but have a rectangular cross-section, whereas the vertical members 74 are round and tapered. The difference in the configuration of the vertical members illustrates another important feature of the invention, that the vertical members can have substantially any desired configuration between the cylindrical formations on the opposite ends thereof, whereby nearly any desired ornamental effect can be obtained.

In order to provide a fuller understanding of how the cylindrical sockets of the rails and the cylindrical formations on the vertical members are arranged, reference is now made to FIGS. 3 and 4, wherein a portion of the bottom rail assembly 22 of FIG. 1, and the lower portion of one of the vertical members 24 are shown in greatly enlarged views. The T-shaped lower rail 120 includes a horizontal web portion 128 and a center leg 130, the latter having transverse cylindrical sockets 132 formed therein, each including an opening 134. The cylindrical sockets 132 extend to both side walls of the center leg 130 to provide a means for inserting the cylindrical formation 136 on the lower end of the vertical member 24, although if desired extension of the sockets 132 to only one side wall would suffice for assembly purposes.

As shown in FIG. 3, each socket 132 is symmetrical about a vertical axis, and must have an arc length in excess of 180° so that it will be effective to retain a mating cylindrical formation. At the same time, the arc length of the socket must not be so great that the width of the opening 134 is narrowed to where pivotal movements of the vertical member 24 relative to the rails are unduly restricted. The arc length must also be sufficiently great that an adequate amount of material is present at the edges of the opening 134 to assure security of the vertical member 24.

The cylindrical formation 136 on the vertical member 24 includes a neck portion 138 having side surfaces 140 that taper inwardly from the body of the member 24 toward a transverse cylinder 142 having an external diameter just slightly smaller than the internal diameter of the socket 132. The neck portion 138 must have sufficient thickness to adequately support the cylinder 142, but must be substantially thinner than the width of the socket opening 134.

It has been found that if the cylindrical formation 136 and the socket opening 134 are configured so that the bottom rail 120 can be placed at an angle of up to about 43° from the horizontal, substantially every commonly used stairs can be accomodated. This is illustrated in FIG. 3, wherein a typical geometric relationship between the socket opening 134 and the neck portion 138 is shown, to achieve this predetermined range of adjustability. Obviously, the precise dimensional relationships chosen will depend on the nature and strength of the materials employed, and the expected necessary range of adjustability. But in every instance, the placement of the cylinders 142 in the cylindrical sockets 132 provide universal adjustability.

Referring now to FIG. 4, the lower retainer member 124 is seen to include a pair of retainer strips 144, connected by a bridge member 146, the retainer strips 144 engaging the side walls of the center leg 130, and serving to retain the cylinders 142 in their sockets. The retainer member 116 is, of course, slid into place after the vertical members 24 have been assembled to the lower rail 120.

A modification of the invention is shown in FIG. 5, wherein the T-shaped lower rail 120 is replaced with a rectangular lower rail 150, having upwardly opening sockets 152 therein corresponding to the sockets 132. In FIG. 5 the retainer member 116 is not utilized, and instead the cylinders 142 of the vertical members 24 are retained in place by retainer strips 154, secured by fasteners 156 to the lower rail 150. Obviously, other retainer arrangements for the cylinders 142 are also possible.

The upper and lower rails and the vertical members of the invention can be manufactured from metal, plastic or wood, economically and with assurance that the elements can be easily assembled in the field. For example, the rails and the vertical members can be extruded from aluminum or a suitable plastic, or they can be milled from wood stock. In all instances, the critical portions of the elements are the cylindrical formations and their mating cylindrical sockets, which provide for adjustability of the railings. Other portions of the elements can be shaped as desired, to provide a wanted ornamental effect.

It is contemplated that the elements for making railing sections according to the invention be carried in stock by the retailer or wholesaler, preferably on a mix and match basis. The ready interchangeability of the vertical members on different rails makes this possible. For example, a retailer might carry upper and lower T-shaped rails that were identical, and an assortment of vertical members, of different lengths, and with different shapes centrally thereof. Further, the stock might contain upper and lower T-shaped retainer members having different external configurations, and mounting posts of different shapes. A contractor or homeowner can then pick and choose, to assemble a railing appealing to his or her personal tates. This flexibility of use is new to the art, and is perhaps one of the most important features of the invention.

Once a rail section has been assembled, it is fitted to the mounting posts, if such are used, or to a wall or other supporting surface. When the rail section is made of wood, such fitting is easily done with a square, level and saw, the ends of the upper and lower rails being cut off at the angle necessary to mount the section in a proper orientation with the vertical members thereof in the desired relationship. The ends of the rail section can then be secured by the screws 16, or other suitable means. A similar mode of installation is utilized for metal rail sections, although in this instance resort might be had to ready-formed mounting brackets.

Obviously, many modifications and variations of the invention are possible.

I claim:

1. An adjustable railing section, including:
    an upper rail having side walls and an undersurface, said undersurface having spaced, upper cylindrical sockets formed therein extending perpendicular to the longitudinal axis of said upper rail, said upper sockets having an arc length greater than 180° and downwardly facing openings, and extending to at least one side wall of said upper rail;
    a lower rail having side walls and an upper surface, said upper surface having spaced, lower cylindrical sockets formed therein extending perpendicular to the longitudinal axis of said lower rail, said lower sockets having an arc length greater than 180° and upwardly facing openings, and extending to at least one side wall of said lower rail; and a plurality of vertical members each having an upper cylindrical formation on one end and a lower cylindrical formation on the opposite end, said upper and said lower cylindrical formations being slidably receivable within said upper and said lower cylindrical sockets along the longitudinal axes of said sockets, respectively, to connect said upper and said lower rails, said upper and said lower cylindrical formations being rotatable within their associated upper and lower sockets over a predetermined range to provide for adjustments in the angles between said upper and said lower rails and said vertical members, and being retained against separation from said rails in a direction perpendicular to said longitudinal socket axes by the said greater than 180° arc lengths of their associated sockets.

2. An adjustable railing section as recited in claim 1, including additionally:

a retainer strip for each side wall of said upper rail and said lower rail to which said upper cylindrical sockets and said lower cylindrical sockets, respectively, extend; and means for securing said retainer strips to said side walls of said upper and said lower rails, to secure said upper and said lower cylindrical formations within their respective upper and lower cylindrical sockets.

3. An adjustable railing section as recited in claim 1, including additionally:

a retainer assembly for each of said upper and said lower rails, each retainer assembly including:

a pair of parallel retainer strips placed apart a distance slightly greater than the distance between said side walls of the respective upper or lower rail; and a bridging member connecting said retainer strips of each assembly, on the edges thereof facing away from said vertical members, said retainer members being sidably receivable on their respective upper and lower rails to secure said upper and said lower cylindrical formations within their sockets.

4. An adjustable railing as recited in claim 1, wherein each of said upper and said lower cylindrical formations comprises:

a neck portion formed on the end of said vertical member; and a cylinder mounted on said neck portion, said openings of said upper and said lower sockets having a width greater than the thickness of said neck portions of said upper and said lower cylindrical formations, whereby to provide for rotational movement of said cylinders within their respective upper and lower cylindrical sockets.

5. An adjustable railing as recited in claim 4, wherein said neck portions are designed and arranged to provide for movement of said vertical members over an arc length of about 43° from a position extending perpendicular to the longitudinal axes of said upper and said lower rails.

6. An adjustable railing section, including:

an upper rail having side walls and an undersurface, said undersurface having spaced, upper cylindrical sockets formed therein extending perpendicular to the longitudinal axis of said upper rail, said upper sockets having downwardly facing openings, and extending to at least one side wall of said upper rail;

a lower rail having side walls and an upper surface, said upper surface having spaced, lower cylindrical sockets formed therein extending perpendicular to the longitudinal axis of said lower rail, said lower sockets having upwardly facing openings, and extending to at least one side wall of said lower rail;

a plurality of vertical members each having an upper cylindrical formation on one end and a lower cylindrical formation on the opposite end, said upper and said lower cylindrical formations being slidably receivable within said upper and said lower cylindrical sockets, respectively, to connect said upper and said lower rails, said upper and said lower cylindrical formations being rotatable within their associated upper and lower sockets over a predetermined range to provide for adjustments in the angles between said upper and said lower rails and said vertical members;

a retainer assembly for each of said upper and said lower rails, each retainer assembly including:

a pair of parallel retainer strips placed apart a distance slightly greater than the distance between said side walls of the respective upper or lower rail; and a bridging member connecting said retainer strips of each assembly, on the edges thereof facing away from said vertical members, said retainer members being slidably receivable on their respective upper and lower rails to secure said upper and said lower cylindrical formations within their sockets; and each of said upper and said lower rails being generally T-shaped in cross-section, said upper and said lower cylindrical sockets being contained within the center legs of their respective upper and lower T-shaped rails, and said retainer members having a T-shaped internal cross-section, whereby they are slidable onto their respective upper and lower rails and are secured in place by said T-shaped configuration.

7. An adjustable railing section, including:

an upper rail having side walls and an undersurface, said undersurface having spaced, upper cylindrical sockets formed therein extending perpendicular to the longitudinal axis of said upper rail, said upper sockets having downwardly facing openings, and extending to at least one side wall of said upper rail;

a lower rail having side walls and an upper surface, said upper surface having spaced, lower cylindrical sockets formed therein extending perpendicular to the longitudinal axis of said lower rail, said lower sockets having upwardly facing openings, and extending to at least one side wall of said lower rail; and a plurality of vertical members each having an upper cylindrical formation on one end and a lower cylindrical formation on the opposite end, said upper and said lower cylindrical formations being slidably receivable within said upper and said lower cylindrical sockets, respectively, to connect said upper and said lower rails, said upper and said lower cylindrical formations being rotatable within their associated upper and lower sockets over a predetermined range to provide for adjustments in the angles between said upper and said lower rails and said vertical members;

each of said upper and said lower cylindrical formations comprising:
a neck portion formed on the end of said vertical member; and
a cylinder mounted on said neck portion, said openings of said upper and said lower sockets having a width greater than the thickness of said neck portions of said upper and said lower cylindrical formations, whereby to provide for rotational movement of said cylinders within their respective upper and lower cylindrical sockets,
said neck portions of said upper and lower cylindrical formations being tapered outwardly, moving from said cylinders toward said vertical members.

8. An adjustable railing assembly, including:
a first and a second post for mounting on first and second surfaces;
first and second mounting bracket means for securing said first and second posts on said first and said second surfaces, respectively, and each including means for adjusting said first and said second posts during securing thereof so that they extend vertically; and
an upper railing section mountable between said first and said second posts, and including:
an upper rail securable between the upper portions of said first and said second posts, said upper rail having side walls and an undersurface, said undersurface having spaced, upper cylindrical sockets formed therein extending perpendicular to the longitudinal axis of said upper rail, said upper sockets having downwardly facing openings, and extending to at least one side wall of said upper rail;
a lower rail securable between the lower portions of said first and said second posts, said lower rail having side walls and an upper surface, said upper surface having spaced, lower cylindrical sockets formed therein extending perpendicular to the longitudinal axis of said lower rail, said lower sockets having upwardly facing openings, and extending to at least one side wall of said lower rail; and
a plurality of vertical members each having an upper cylindrical formation on one end and a lower cylindrical formation on the opposite end, said upper and said lower cylindrical formations being slidably receivable within said upper and said lower cylindrical sockets, respectively, to connect said upper and lower rails, said upper and said lower cylindrical formations being rotatable within their associated upper and lower sockets over a predetermined range to provide for adjustments in the angles between said upper and said lower rails and said vertical members.

9. An adjustable railing assembly as recited in claim 8, wherein said first and said second posts each have parallel, opposed faces on the lower end thereof, and wherein each of said mounting bracket means includes:
a U-shaped bracket, including a base wall securable to the associated surface, and a pair of vertical, parallel walls spaced apart a distance slightly greater than the spacing between the parallel, opposed faces on the lower ends of said first and second posts, said vertical walls having first, aligned bores therein for use in adjusting the vertical position of the associated post in a first vertical plane containing said first bores, and at least one second bore from said first, aligned bores for use in adjusting the vertical position of said associated post in a second vertical plane perpendicular to said first vertical plane; spaced from
a first pair of fasteners, insertable one at a time through said first, aligned bores to effect vertical securement of said associated post in said first vertical plane; and
at least one second fastener, insertable through said second bore to effect vertical securement of said associated post in said second vertical plane.

10. An adjustable railing assembly as recited in claim 9, including additionally
a collar slidably received on the lower end of each post, said collar having the interior thereof shaped to receive and accomodate said mounting bracket means.

11. In an adjustable railing system, at least one post supporting an adjustable railing section, said post having parallel, opposed faces on the lower end thereof, and mounting bracket means securing said post in a vertical position on a surface, said mounting bracket means including:
a U-shaped bracket open at its opposite ends, including a base wall secured to said surface, and a pair of vertical, parallel walls spaced apart a distance slightly greater than the spacing between said opposed faces receiving said lower end of said post therebetween, said vertical walls having first, aligned bores therein for use in adjusting the vertical position of said post in a first vertical plane containing said first bores, and at least one second bore spaced horizontally from said first aligned bores for use in adjusting the vertical position of said post in a second vertical plane perpendicular to said first vertical plane;
a first pair of fasteners, insertable one at a time through said first, aligned bores to effect vertical securement of said post in said first vertical plane; and
second fasteners, insertable through said second horizontally spaced bores to effect vertical securement of said post in said second vertical plane.

* * * * *